United States Patent Office 3,536,634
Patented Oct. 27, 1970

3,536,634
PROCESS FOR POLYMERIZATION OF EPOXIDES WITH ORGANOZINC COMPOUNDS
Edwin J. Vandenberg, Wilmington, Del., assignor to Hercules Incorporated, a corporation of Delaware
No Drawing. Filed Mar. 31, 1960, Ser. No. 18,862
Int. Cl. C08g 23/14
U.S. Cl. 260—2          13 Claims This invention relates to a new process for polymerizing epoxides and more particularly to a process for polymerizing epoxides with organozinc compounds whereby high molecular weight polyepoxides of outstanding properties are produced.

In accordance with this invention it has been discovered that greatly improved results are obtained in the polymerization of epoxides when there is used as the catalyst for the polymerization a dihydrocarbon zinc compound that has been reacted with a polyfunctional compound selected from the group consisting of water, nonaromatic polyols wherein there is at least one carbon between the COH groups, and polyhydric phenols. The amount of the water, glycol or phenol that is reacted with the dihydrocarbon zinc is critical and should be an amount within the range of from about 0.2 mole to about 1.2 mole of the polyfunctional compound per mole of dihyddocarbon zinc. By carrying out the polymerization in accordance with this invention it has been found that the conversion and/or rate of polymerization and/or yield are greatly improved over the process when a diorganozinc which has not been reacted with one of these polyfunctional compounds is used as the catalyst. In addition, a much higher molecular weight polymer is obtained, and in some cases a more stereoregular polymer results.

Any epoxide may be horopolymerized or copolymerized with a second epoxide by the process of this invention. Outstanding results are obtained with ethylene oxide, mono-substituted ethylene oxides

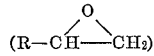

and symmetrically di-substituted ethylene oxides

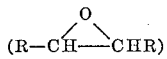

where R is a hydrocarbon radical such as alkyl, aryl, cycloalkyl, etc. Exemplary of these epoxides that may be homopolymerized or copolymerized are the alkylene oxides such as ethylene oxide, propylene oxide, 1-butene oxide, 2-butent oxides, isobutylene oxide, 1-hexene oxide, and substituted alkylene oxides such as cyclohexene oxide, styrene oxide, glycidyl ethers of phenol, bis-phenol, etc., unsaturated epoxides such as vinyl cyclohexene mono- and dioxides, butadiene monoxide, allyl glycidyl ether, etc. Halogen-containing epoxides may also be polymerized by this process and are particularly important in the preparation of copolymers of alkylene oxides. Exemplary of such halogen-containing epoxides that may be so polymerized or copolymerized are epichlorohydrin, epibromohydrin, epifluorohydrin, trifluoromethyl ethylene oxide, perfluoropropylene oxide, perfluoroethylene oxide, etc.

Any organozinc compound having the formula ZnRR', where R and R' are hydrocarbon radicals that may be alike or different, when reacted with the above-mentioned polyfunctional compounds may be used as the catalyst for the polymerization of epoxides in accordance with this invention. Exemplary of the dihydrocarbon zinc compounds that may be used for the preparation of the catalyst are dimethylzinc, diethylzinc, dipropylzinc, diisopropylzinc, di-n-butylzinc, diisobutylzinc, di-tert-butylzinc, diamylzinc, dioctylzinc, dicyclohexylzinc, dicyclopentadienylzinc, diphenylzinc, etc. The dialkylzinc compounds being more readily obtained are generally preferred. Regardless of the dihydrocarbon zinc compound that is used, it should be reacted with water, a polyol or a polyhydric phenol in a molar ratio of from about 0.2 mole to about 1.2 mole, and preferably from about 0.4 mole to about 1.0 mole per mole of dialkylzinc compound. Below or above these ratios the polymerization is retarded or otherwise adversely affected, as for example, there is produced a liquid polymer instead of a high molecular weight solid polymer. The exact amount of the polyfunctional compound that is reacted with the organozinc compound will depend to some extent upon the diluent, temperature, the epoxide being polymerized, the desired molecular weight of the polymer to be produced, the method of preparing the catalyst, whether more than one polyfunctional compound is used, whether the polyfunctional compound is difunctional or tir-, tetra-, etc.-, functional, lesser amounts of the latter being required, etc.

As pointed out above, the diorganozinc used as the catalyst in accordance with this invention is reacted with water, a nonaromatic polyol wherein there is at least one carbon between the COH groups, or a polyhydric phenol. An alkylene glycol containing less than three carbon atoms; namely, ethylene glycol, is not operable since for some unexplainable reason, when a zinc dialkyl, as for example, diethylzinc, is reacted with ethylene glycol, even within the specified molar ratio, essentially no polymerization takes place. Any nonaromatic polyol, as for example, alkylene glycols and cycloaliphatic glycols, containing at least one carbon between the COH groups may be used for this purpose. Such alkylene glycols will have the general formula

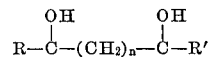

where R and R' may be hydrogen or alkyl and alike or different and n is at least 1. Exemplary of the alkylene glycols and cycloaliphatic polyols that may be used are trimethylene glycol, tetramethylene glycol, pentamethylene glycol, 2-butene-1,4-diol, 2-butyne-1,4-diol, 1,3-cyclohexanediol, 1,4-cyclohexanediol, etc. Exemplary of the polyhydric phenols that may be used are resorcinol, hydroquinone, catechol, etc.

The exact nature of this reaction product of the dihydrocarbon zinc compound with the above-specified polyfunctional compounds is not known. It is believed that a reaction takes place whereby a portion of the alkyl group of the organo group of the dihydrocarbon zinc is replaced, as for example, when a dialkylzinc is reacted with the polyfunctional compound, the alkyl group is replaced with the liberation of the alkane and replacement of the alkyl group with an O-H in the case of water or an OR group in the case of polyols, the R depending upon the polyfunctional compound. This theory is based on the fact that analysis of typical catalysts prepared in accordance with this invention by reacting diethylzinc with water in a molar ratio of 1:1 showed that there remained in the catalyst 0.6 and 0.9 ethyl group per mole of zinc, depending on the conditions under which it was prepared, and in a typical catalyst prepared by reaction of diethylzinc with tetramethylene glycol in a molar ratio of 0.8 mole of glycol to 1 mole of zinc alkyl there remained in the catalyst 0.7 ethyl group per mole of zinc. Regardless of what the theory of the reaction may be, it is essential that the reaction product retain zinc-carbon bonds in an amount of from about 0.1 to about 1.6 carbon bonds per zinc atom, and preferably from about 0.3 to about 1.2 carbon bonds per zinc atom, which catalysts are obtained when the organozinc compound is reacted with the polyfunctional compound in the above-specified molar ratios.

Any desired procedure may be used for reacting the dihydrocarbon zinc with the specified molar ratio of polyfunctional compound. Thus, the diorganozinc and polyfunctional compound may be prereacted by adding the specified amount of the polyfunctional compound to a solution of the diorganozinc in an inert diluent, as for example, a hydrocarbon diluent, such as n-hexane, n-heptane, toluene, or an ether such as diethyl ether or a mixture of such diluents. These diorganozinc, water, polyol or polyphenol reaction products may be used immediately or aged, or if desired, heat-treated in some cases. The reaction of the diorganozinc and the polyfunctional compound is preferably carried out prior to use in the polymerization reaction, especially in the case of the polyols, but it may also be carried out by reacting the two reagents in situ in the polymerization reaction mixture. This may be accomplished by the addition of a specified amount of the polyfunctional compound to the epoxide or mixture of epoxides being polymerized and then adding the diorganozinc compound, or the two reagents may be added to the polymerization reaction mixture simultaneously.

In some cases it has been found to be advantageous to react the diorganozinc—polyfunctional compound reaction product with a complexing agent, as for example, an ether such as diethyl ether, tetrahydrofuran, etc., a tertiary amine a tertiary phosphine, etc. It may be reacted first with the water, polyol, or polyhydric phenol, and then with the complexing agent, or the complexing agent may be present while forming the catalyst. The amount of complexing agent reacted with the cataylst is generally within the range of from about 0.5 mole to about 30 moles, and preferably from about 1 to about 10 moles per mole of organozinc compound used in preparing the catalyst, depending on the complexing agent used.

Any amount of the diorganozinc reaction product prepared as described above may be used to catalyze the polymerization process in accordance with this invention from a minor catalytic amount up to a large execess, but in general, will be within the range of from about 0.2 to about 10 mole percent based on the zinc and the monomer being polymerized and preferably will be within the range of from about 1 to about 5 mole percent based on the zinc and the monomer or monomers being polymerized. The amount used depends in part on such factors as monomer purity, diluent purity, etc., less pure epoxides and diluents requiring more catalyst to destroy reactive impurities. In order to decrease catalyst consumption it is generally preferred that impurities such as carbon dioxide, oxygen, aldehydes, alchols, etc., be kept at as low a level as practical.

The polymerization reaction may be carried out by any desired means either as a batch or continuous process with the catalyst added all at one time or in increments during the polymerzation or continuously throughout the polymerization. If desired, the monomer may be added gradually to the polymerization system. It may be carried out as a bulk polymerization process, in some cases at the boiling point of the monomer (reduced or raised to a convenient level by adjusting the pressure) so as to remove the heat of reaction. It may also be carried out in the presence of an inert diluent. Any diluent that is inert under the polymerization reaction conditions may be used as, for example, ethers such as the dialkyl, aryl or cycloalkyl ethers such as diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc. Obviously, any mixture of such diluents may be used and in many cases is preferable. The polymerization process may also be carried out in the presence of additives such as antiozidants, carbon black, zinc stearate, sulfur, some accelerators and other curatives, etc.

The polymerization process in accordance with this invention may be carried out over a wide temperature range and pressure. Usually it will be carried out at a temperature from about $-80°$ C. up to about $150°$ C., preferably within the range of from about $-50°$ C. to about $120°$ C., and more preferably from about $-30°$ C. to about $100°$ C. Usually, the polymerization process will be carried out at autogeneous pressure, but superatmospheric pressures up to several hundred pounds may be used if desired and in the same way, subatmospheric pressures may also be used.

The following examples exemplify the improved results that may be obtained on polymerizing epoxides in accordance with this invention. All parts and percentages are by weight unless otherwise indicated. As will be seen from these examples, the process of this invention makes it possible to not only obtain greatly improved yields of polymer but makes it possible to produce polymers of exceptionally high molecular weight. The molecular weight of the polymers produced in these examples is shown by the reduced specific viscosity (RSV) given for each. By the term "Reduced Specific Viscosity" is meant the $\eta sp/c$ determined on a 0.1% solution of the polymer in a given diluent. In the case of polyethylene oxide the RSV is determined in chloroform at $25°$ C., and in the case of polypropylene oxide the RSV is determined in benzene at $25°$ C. Hence, in the citation of the RSV, the diluent and temperature at which the RSV is determined are stipulated.

Examples 1–6

In each of these examples a polymerization vessel filled with nitrogen was charged with that part of the diluent not added with the catalyst (n-heptane in Examples 1 and 2c, none in Examples 3, 4 and 6, ether in Examples 2a and b, and toluene in Example 5) and 10 parts of the monomer or mixture of monomers. After equilibrating the vessel and contents at $30°$ C., the catalyst was injected. The catalyst dispersions used in each of these examples was prepared from 0.49 part of diethylzinc by diluting n-heptane solutions of diethylzinc with ether to 0.5 M concentration except in Example 2b where it was diluted to 0.4 M concentration, and then adding an amount of water equal to the specified mole ratio, and agitating the mixture in the presence of glass beads at $30°$ C. for 20 hours. In the controls, Examples 1a and 2a, no ether and no water were added to the n-heptane solution of diethylzinc. The catalyst prepared and used in Example 1b was analyzed by gas evolution to determine the amount of ethyl-zinc bonds present, and it was found to contain a mole ratio of ethyl to zinc of 0.9. The polymerization reaction mixtures were agitated at $30°$ C. for 19 hours in Examples 1–4 and 6, and 3.5 or monomers polymerized, the total parts of diluent hours in Example 5. In Table I is set forth the monomer and the percent thereof that was ether, and the catalyst.

The ether-insoluble polyethylene oxide produced in Examples 1a–c was isolated by adding excess ether to the reaction mixture, filtering off the insoluble portion, washing it with ether, then with 0.5% hydrogen chloride in an 80:20 mixture of ether:methanol, with 80:20 ether: methanol alone, and then with ether containing 0.5%

Santonox, i.e. 4,4′-thiobis(6-tert-butyl-m-cresol) and dried under vacuum for 16 hours at 50° C. The polymers produced in Examples 2a–c, 3 and 6 were isolated in each case by adding sufficient ether to make the solution of a low enough viscosity for ease in handling, then washing the reaction mixture twice with a 3% aqueous solution of hydrogen chloride (stirring for one hour for each wash), washing with water until neutral, then with aqueous 2% sodium bicarbonate and again washing with water until neutral. After adding an amount of Santonox equal to 0.5% based, on the polymer to the reaction mixture, the diluents were evaporated, and the polymer was dried for 16 hours at 80° C. at 0.4 mm. pressure. The poly(epichlorohydrin) produced in Example 4 was isolated by diluting the reaction mixture with 40 parts of diethyl ether, separating the ether-insoluble polymer and washing it twice with ether. It was then purified by slurrying the insoluble polymer with a 1% solution of hydrogen chloride in ethanol, again collecting the insoluble polymer, washing it with methanol until neutral and then with a 0.4% solution of Santonox in methanol and finally drying the polymer for 16 hours at 50° C. under vacuum. The ethylene oxide-epichlorohydrin copolymer produced in Example 5 was isolated by precipitating the polymer from the reaction mixture by adding 4 volumes of heptane, and then purifying the heptane-insoluble polymer as described for the ether-insoluble polyethylene oxide.

In Table I is set forth the total percent conversion to polymer in each case together with the amount of isolated polymer produced in each case, indicated as percent conversion of the monomer or monomers to isolated polymer, and percent of the total polymer and the RSV of the polymer in the indicated diluent. In Examples 1 and 4 where the isolated polymer was ether-insoluble, the conversion to ether-soluble polymer produced as determined by a total solids on an aliquot of the ether or heptane plus ether washes is set forth along with a description of the ether-soluble polymer.

The polypropylene oxide obtained in Example 2b was rubbery and had an RSV of 1.5. It was recrystallized from a 1% acetone solution at −18° C. to give a crystalline, stereoregular, polypropylene oxide fraction equal to 12% of the total polymer. This fraction had an RSV of 5.5. The polypropylene oxide isolated in Example 2c was a tough rubber, which on X-ray was shown to have a moderate crystallinity (pattern of stereoregular polypropylene oxide) and, hence, was a mixture of crystalline and amorphous polymer.

The poly(1-butene oxide) produced in Example 3 was a rubbery solid. The poly(epichlorohydrin) produced in Example 4 was amorphous by X-ray. The ethylene oxide-epichlorohydrin copolymer produced in Example 5 was a tough, somewhat rubbery, white film. On analysis it was found to contain 3.1% chlorine indicating that the copolymer contained 8.2% of epichlorohydrin. By X-ray it was shown to have a considerable amount of crystallinity.

The propylene oxide-allyl glycidyl ether copolymer produced in Example 6 was a rubbery copolymer which on infrared analysis was shown to contain 8% of allyl glycidyl ether. A portion of this copolymer was fractionated by recrystallization from a 1% acetone solution at −18° C. to give a crystalline stereoregular, fraction equal to 20% of the total. This fraction had an RVS of 12.0 and was shown by X-ray to be highly crystalline and by infrared analysis to contain 10.1% allyl glycidyl ether. It was a strong, snappy rubber. It had an ultimate tensile strength of 1,450 p.s.i. (rate of elongation of 1 inch per minute) and an ultimate elongation of 350%. At an elongation rate of 20 in./min. it had a tensile strength of 860 p.s.i. and ultimate elongation of 350%. Thus, this copolymer had rubbery properties with considerable strength without vulcanization. The acetone-soluble fraction of the copolymer was equal to 75% of the total, and an RSV of 7.6. By X-ray it was shown to be largely amorphous and infrared analysis showed it to contain 10.0% of allyl glycidyl ether. It was rubbery but had no strength.

TABLE I

| | | Diluent | | | Total | Isolated polymer | | Ether-Soluble polymer | |
|---|---|---|---|---|---|---|---|---|---|
| Example | Monomer [1] | Total, parts | Percent ether | Catalyst | percent conv. | Percent conv. | RSV | Percent conv. | Description |
| 1a | Ethylene oxide | 34 | 0 | $(C_2H_5)_2Zn$ | 59 | Trace | | 59 | Liquid. |
| 1b | do | 33.8 | 7.4 | $(C_2H_5)_2Zn$-1.0,$H_2O$ | 84 | 84 | [2] 72 | 0 | |
| 1c | do | 33.8 | 7.4 | $(C_2H_5)_2Zn$-1.5,$H_2O$ | 0 | | | 0 | |
| 2a | Propylene oxide | 18.8 | 90 | $(C_2H_5)_2Zn$ | 2 | 2.7 | [3] 0.04 | | |
| 2b | do | 18.8 | 90 | $(C_2H_5)_2Zn$-0.5,$H_2O$ | 6 | 6.4 | [3] 1.5 | | |
| 2c | do | 33.8 | 10.3 | $(C_2H_5)_2Zn$-0.9,$H_2O$ | 100 | 99 | [3] 12 | | |
| 3 | 1-butene oxide | 5 | 70 | $(C_2H_5)_2Zn$-0.9,$H_2O$ | 100 | 80 | [3] 7.5 | | |
| 4 | Epichlorohydrin | 5 | 70 | $(C_2H_5)_2Zn$-0.9,$H_2O$ | 7 | 5.8 | [4] 2.1 | 1 | Soft wax. |
| 5 | 80:20, EO:ECH | 41.7 | 8.4 | $(C_2H_5)_2Zn$-0.9,$H_2O$ | 17 | 17 | [1] 7.2 | | |
| 6 | 90:10, PO:AGE | 5 | 70 | $(C_2H_5)_2Zn$-0.9,$H_2O$ | 85 | 76 | [3] 15.4 | | |

[1] EO=Ethylene Oxide; PO=Propylene Oxide; ECH=Epichlorohydrin; AGE=Allyl Glycidyl Ether.
[2] Chloroform at 25° C.
[3] Benzene at 25° C.
[4] α-Chloronaphthalene at 100° C.

Example 7

Example 6 was repeated except that the polymerization reaction was run for 19 hours instead of 20 hours at 30° C. The propylene oxide—allyl glycidyl ether copolymer was isolated by shortstopping the polymerization with 4 parts of ethanol, adding sufficient benzene to dissolve the polymer (about 87 parts) plus 0.1 part of phenyl β-naphthylamine and then after thorough mixing, removing the solvent by air-drying and finally drying at 80° C. under vacuum for 16 hours. The product so obtained amounted to a conversion of 75% and had an RSV of 19.8 (benzene at 25° C.). A portion of this copolymer was vulcanized using the following formula:

| | Parts |
|---|---|
| Copolymer | 100 |
| High abrasion furnace black | 50 |
| Mercaptobenzothiazole | 1.5 |
| Zinc oxide | 3.0 |
| Stearic acid | 2.0 |
| Sulfur | 2.0 | and press-curing for 60 min. at 310° F. The physical properties of this vulcanizate were

| | |
|---|---|
| Tensile strength, p.s.i. | 2,120 |
| Ultimate elongation, percent | 400 |
| 300% modulus, p.s.i. | 1,650 |
| Shore hardness (A2) | 79 |
| Rebound, percent | 28 |
| Break set, percent | 10 |

Example 8

Example 6 was repeated except that the catalyst was prepared in situ by first injecting 0.06 part of water into the monomer and then adding a solution of 0.49 part of diethylzinc in 1.5 parts of n-heptane (molar ratio of water to zinc of 0.9:1) and the polymerization was run for 17 hours at 30° C. The total percent conversion was 89. The isolated propylene oxide—allyl glycidyl ether copolymer so produced had an RSV of 8.0, and by infrared analysis was shown to contain 11% allyl glycidyl ether. It was a snappy rubber.

Example 9

Ethylene oxide (10 parts) was polymerized by the general procedure described in Example 1 except that in this case the catalyst was diethylzinc (0.49 part) in 5.0 parts of a mixture of ether and n-heptane containing 70% ether, which had been reacted with 0.9 mole of water per mole of zinc, agitated for 20 hours at 30° C. and then reacted with 1.0 mole of triethylamine per mole of zinc and again agitated for 20 hours at 30° C. The polymerization was run for 19 hours at 30° C., and the polymer was isolated as in Example 1. A total conversion of 93% was obtained, all of which was ether-insoluble. This poly(ethylene oxide) had an RSV of 115.

Example 10

Propylene oxide (9 parts) and allyl glycidyl ether (1 part) were copolymerized in n-heptane as the sole diluent following the general procedure described in Example 6. In this case the catalyst was prepared by reacting 0.25 part of diethylzinc in n-heptane (0.5 M solution) at 0° C. with water in a 1:1 molar ratio, the water being added over a period of 3 minutes while stirring, continuing the agitation for 15 min. at 0° C. and then for 30 min. at room temperature. The polymerization reaction was run for 19 hours at 30° C. The copolymer was isolated as described in Example 7. It amounted to a conversion of 55% and had an RSV of 19.7. It was a snappy rubber.

Example 11

In each of these runs propylene oxide and allyl glycidyl ether were copolymerized as described in Example 6 except that the catalysts were prepared in each case by reacting a 0.49 part of diethylzinc (0.5 M solution in 70:30 ether:n-heptane) with water in the indicated molar ratio at 0° C. and then aging at room temperature for 2 hours prior to use. Each of the catalysts was analyzed to determine the ethyl-to-zinc bonds present. The amount of diluent present in each run was that present in the catalyst dispersion, 3.8 parts of 60:40 ether:heptane in Run (a) the control and 5.2 parts of 70:30 ether:heptane in Runs b–c. The polymerizations were run for 20 hours at 30° C. Tabulated below is the catalyst used, the molar ratio of ethyl group to zinc, the total percent conversion, percent conversion of isolated polymer, and the RSV of the copolymer.

| Catalyst | Ethyl/Zn | Total percent conv. | Isolated polymer Percent conv. | RSV |
|---|---|---|---|---|
| (a) $(C_2H_5)_2Zn$ | 2.0 | 5 | 4 | 0.03 |
| (b) $(C_2H_5)_2Zn \cdot 0.5 \, H_2O$ | 1.4 | 15 | 13 | 0.18 |
| (c) $(C_2H_5)_2Zn \cdot 1.0 \, H_2O$ | 0.6 | 36 | 36 | 9.4 |
| (d) $(C_2H_5)_2Zn \cdot 1.2 \, H_2O$ | 0.20 | 23 | 15 | 6.2 |
| (e) $(C_2H_5)_2Zn \cdot 1.4 \, H_2O$ | 0.15 | 1 | 1 | |

Example 12

Propylene oxide and allyl glycidyl ether were copolymerized following the procedure described for Example 11c except the n-heptane was added as a diluent so that the total diluent was 68 parts of which 2.6% was ether. Only half the amount of catalyst was used and the polymerization was run for 20 hours at 50° C. The copolymer so produced was a snappy rubber and had an RSV of 3.6.

Examples 13 and 14

In each of these examples, propylene oxide and allyl glycidyl ether were copolymerized with the catalyst formed in situ as described in Example 8, using a diethylzinc—water reaction product in Example 13 and a diethylzinc—resorcinol reaction produced in Example 14, in each instance an amount equal to 0.49 part of diethylzinc. In each case the polymerization was run for 19 hours at 30° C. In Example 13 the copolymer was isolated as in Example 6. In Example 14 the copolymer was isolated by adding ether to the polymerization reaction mixture, then washing the solution twice with aqueous 10% sodium hydroxide, washing with water until neutral, and after adding 0.5% of Santonox base on the polymer, drying under vacuum at 80° C. for 16 hours. In Table II is tabulated the total amount of diluent used and percent of ether therein, the catalyst, the total percent conversion and percent conversion of isolated copolymer and the RSV of the copolymer.

TABLE II

| | Diluent | | | Total percent conv. | Isolated polymer | |
|---|---|---|---|---|---|---|
| | Total, parts | Percent ether | Catalyst | | Percent conv. | RSV |
| Example: | | | | | | |
| 13a | 1.5 | 0 | $(C_2H_5)_2Zn$ | 10 | 6 | 0.08 |
| 13b | 1.5 | 0 | $(C_2H_5)_2Zn \cdot 0.25, H_2O$ | 38 | 32 | 0.14 |
| 13c | 1.5 | 0 | $(C_2H_5)_2Zn \cdot 0.50, H_2O$ | 43 | 37 | 1.2 |
| 13d | 1.5 | 0 | $(C_2H_5)_2Zn \cdot 0.75, H_2O$ | 71 | 62 | 5.4 |
| 13e | 1.5 | 0 | $(C_2H_5)_2Zn \cdot 1.0, H_2O$ | 52 | 39 | 10.6 |
| 14a | 3.8 | 60 | $(C_2H_5)_2Zn$ | 5 | 4 | 0.03 |
| 14b | 3.8 | 60 | $(C_2H_5)_2Zn \cdot 0.5$ resorcinol. | 18 | 17 | 2.1 |

Example 15

A nitrogen filled polymerization vessel was charged with 9 parts of propylene oxide, 1 part of allyl glycidyl ether, 5 parts of high abrasion furnace carbon black, and 0.1 part of phenyl β-naphthylamine. The catalyst used was prepared by reacting at 0° C., 0.98 part of diethylzinc with water in a 1:1 molar ratio in a 70:30 ether:n-heptane mixture (0.5 M concentration) and this catalyst dispersion was aged 4 hours at room temperature before use. The only diluent present in the polymerization was that added with the catalyst. The polymerization was run for 19 hours at 30° C. There was obtained a 100% conversion to copolymer.

Example 16

The catalyst used in this example was diethylzinc prereacted with 0.9 mole of water per mole of zinc, prepared in a mixture of n-heptane and ether (0.5 M concentration) as described in Examples 1–6.

Into a stirred, nitrogen filled, reaction vessel was charged 285 parts of n-heptane, 4.3 parts of ethylene oxide, and with the temperature at 32° C., 28 parts of the above catalyst dispersion was added. Over the next 10 min. there was alternately added 3.5 parts of ethylene oxide, 14 parts of catalyst dispersion, 2.6 parts of ethylene oxide and 14 parts of the catalyst dispersion. Ethylene oxide was then added at the rate it was polymerized (about 35 g./1./hr.), the temperature being held at 32–37° C. The polymer formed as a slurry of dense particles. After 3.5 hours total reaction time, 32 parts of anhydrous ethanol was added to the slurry and the insoluble polymer was separated by filtration. It was washed with ether and purified as described in Examples 1a–c. The poly(ethylene oxide) so obtained amounts to 66 parts and had an RSV of 16.4. There was essentially no ether-soluble polymer formed.

Examples 17–26

In these examples ethylene oxide was polymerized using as the catalyst diethylzinc which had been prereacted with various polyhydroxy compounds. In each case 10 parts of ethylene oxide was polymerized using the general procedure described in Examples 1–6, carrying out the polymerization for 19 hours in Examples 17–21 and 26 and 21 hours in Examples 22–25 at 30° C. The catalyst solutions were prepared as described in those examples, except that the water was replaced with the specified amount of the polyhydroxy compound. The initial heptane solution of diethylzinc was in each case diluted to 0.5 M concentration, except in Examples 18, 21, 24 and 26 where the catalyst dispersions were diluted to 0.33 M concentration. The amount of catalyst used was prepared from 0.49 part of diethylzinc, except in the case of Examples 18 and 21 when 0.31 part of diethylzinc was used. The ether-insoluble ethylene oxide produced in each case was isolated as described in Examples 1–6. In Table III is set forth the total parts of diluent which was a mixture of ether and n-heptane and the percent of ether therein, the catalyst used, together with total percent conversion, and the conversion to ether-insoluble polymer and ether-soluble polymer and the RSV of the ether-insoluble polymer.

6. The process of claim 1 wherein the epoxide that is polymerized is an alkylene oxide.

7. The process of claim 6 wherein the polyol is an alkylene glycol.

8. The process of polymerizing ethylene oxide which comprises contacting ethylene oxide at a temperature of from about −80° to about 150° C. with the catalyst formed by reacting diethylzinc with tetramethylene glycol in a molar ratio of glycol to diethylzinc of from about 0.4:1 to about 1.0:1.

9. The reaction product useful as a catalyst for the polymerization of epoxides of the complex reaction product of (A) at least one compound of the formula $MR_2$ in which M is zinc and each R is a monovalent hydrocarbon radical and (B) an organic compound free of active hydrogen and containing at least one ethereal oxygen atom with (C) a compound of the formula $R'''ZH$ in which $R'''$ is the hydrogen atom and Z is the oxygen atom, where the molar ratio of A to B is such that for each molecule of A there is sufficient amount of B to supply at least two ethereal oxygen atoms and where the molar ratio of C to A is from about 0.2 to about 1.2.

10. The method for making a polyether which comprises polymerizing (D) a polymerizable organic cyclic oxide having a ring of two carbon atoms and one oxygen atom in contact with, as a catalyst for the polymerization of said oxide, the reaction product of the complex

TABLE III

| Example | Diluent Total, parts | Diluent Percent ether | Catalyst | Total percent conv. | Ether-insoluble polymer Percent conv. | RSV |
|---|---|---|---|---|---|---|
| 17 | 33.8 | 10.3 | $(C_2H_5)_2Zn$·0.8 trimethylene glycol | 46 | 46 | >6.9 |
| 18 | 33.8 | 11.8 | $(C_2H_5)_2Zn$·0.8 tetramethylene glycol | 93 | 93 | 20 |
| 19 | 33.8 | 10.3 | $(C_2H_5)_2Zn$·0.8 pentamethylene glycol | 90 | 90 | 15.5 |
| 20 | 33.8 | 7.4 | $(C_2H_5)_2Zn$·0.5 resorcinol | 58 | 58 | 21 |
| 21 | 33.8 | 11.8 | $(C_2H_5)_2Zn$·0.8 hydroquinone | 27 | 22 | 4.4 |
| 22 | 34 | 11 | $(C_2H_5)_2Zn$·0.8 pyrocatechol | 62 | 62 | 4.8 |
| 23 | 34 | 11 | $(C_2H_5)_2Zn$·0.53 pyrogallol | 99 | 99 | 7.3 |
| 24 | 34 | 11 | $(C_2H_5)_2Zn$·0.53 glycerin | 100 | 100 | 21.7 |
| 25 | 34 | 11 | $(C_2H_5)_2Zn$·0.40 pentaerythritol | 29 | 28 | 4.5 |
| 26 | 34 | 19 | $(C_2H_5)_2Zn$·0.8 Santonox | 73 | 73 | 6.0 |

What I claim and desire to protect by Letters Patent is:

1. The process of producing poly(epoxides) which comprises polymerizing at least one monomeric epoxide, wherein the epoxy group is an oxirane ring, by contacting at a temperature of from about −80° to about 150° C., said epoxide with the catalyst formed by reacting a dialkylzinc, wherein the alkyl groups contain from 1–8 carbon atoms, with a polyol, wherein the hydroxyl groups are attached to nonaromatic carbon atoms and there is at least 1 carbon between the COH groups, in a molar ratio of polyol to zinc compound of from about 0.2:1 to about 1.2:1, said epoxide and polyol being free of groups other than oxirane or hydroxyl groups, respectively, which are reactive with said dialkylzinc catalyst.

2. The process of polymerizing ethylene oxide which comprises contacting ethylene oxide at a temperature of from about −80° to about 150° C. with the catalyst formed by reacting diethylzinc with pentamethylene glycol in a molar ratio of glycol to diethylzinc of from about 0.4:1 to about 1.0:1.

3. The process of polymerizing ethylene oxide which comprises contacting ethylene oxide at a temperature of from about −80° to about 150° C. with the catalyst formed by reacting diethylzinc with glycerin in a molar ratio of glycol to diethylzinc of from about 0.4:1 to about 1.0:1.

4. The process of claim 1 wherein the polyol and zinc compound are reacted prior to contact with said epoxide.

5. The process of claim 1 wherein the polyol and zinc compound are reacted in the presence of said epoxide.

reaction product of (A) at least one compound of the formula $MR_2$ in which M is zinc and each R is a monovalent hydrocarbon radical, and (B) an organic compound free of active hydrogen and containing at least one ethereal oxygen atom with (C) a compound of the formula $R'''ZH$ in which $R'''$ is the hydrogen atom and Z is the oxygen atom, where the molar ratio of A to B is such that for each molecule of A there is a sufficient amount of B to supply at least two ethereal oxygen atoms, where the molar ratio of C to A is from about 0.2 to about 1.2, and where the ratio of D to A and C is from about 10 to 10,000 moles of D per mole of A and C together.

11. The method which comprises (1) reacting (A) at least one compound of the formula $MR_2$ in which M is zinc and each R is a monovalent hydrocarbon radical with (B) an organic compound free of active hydrogen and containing at least one ethereal oxygen atom to form a complex and (2) reacting the complex reaction product of A and B with (C) a compound of the formula $R'''ZH$ in which $R'''$ is the hydrogen atom and Z is the oxygen atom where the molar ratio of A to B is such that for each molecule of A there is sufficient amount of B to supply at least two ethereal oxygen atoms and where the molar ratio of C to A is from about 0.2 to about 1.2, to form a stable second reaction product useful as a catalyst for the polymerization of epoxides.

12. The method of claim 11 wherein A is $ZnR'_2$ in which each R' is a monovalent hydrocarbon radical of from 1 to about 8 carbon atoms and free of aliphatic unsaturation, B is an ether free of active hydrogen and C is water.

13. The method of claim 11 wherein A is $ZnR''_2$ in which each $R''$ is an alkyl radical of from 1 to about 8 carbon atoms, B is a heterocyclic monoether of 4 carbon atoms and free of active hydrogen and C is water.

References Cited

UNITED STATES PATENTS

| | | | |
|---|---|---|---|
| 3,135,705 | 6/1964 | Vandenberg | 260—2 |
| 2,870,100 | 1/1959 | Stewart et al. | 260—2 |
| 2,956,959 | 10/1960 | Detter | 260—2 |
| 3,313,741 | 4/1967 | Uelzmann et al. | |

FOREIGN PATENTS

| | | |
|---|---|---|
| 220,517 | 2/1959 | Australia. |

OTHER REFERENCES

Furukawa Die Makromolekulare Chemie, vol. 32, pp. 90-94.

Furukawa, J. Poly. Sci., vol. 36, pp. 541-3 (April 1959).

Vandenberg, J. Poly. Sci. XLVII, pp. 486-489 (1960)

WILLIAM H. SHORT, Primary Examiner

T. E. PERTILLA, Assistant Examiner

U.S. Cl. X.R.

252—431; 260—47, 88.3

UNITED STATES PATENT OFFICE
CERTIFICATE OF CORRECTION

Patent No. 3,536,634  Dated  October 27, 1970

Inventor(s) Edwin J. Vandenberg

It is certified that error appears in the above-identified patent and that said Letters Patent are hereby corrected as shown below:

Column 1, line 36, "horopolymerized" should read -- homopolymerized --; line 51, "butent" should read -- butene --. Column 2, line 25, "tir-" should read -- tri- --. Column 4, lines 67 to 70, "30° C. for 19 hours in Examples 1-4 and 6, and 3.5 or monomers polymerized, the total parts of diluent hours in Example 5. In Table I is set forth the monomer and the percent thereof that was ether, and the catalyst." should read -- 30° C. for 19 hours in Examples 1-4 and 6, and 3.5 hours in Example 5. In Table I is set forth the monomer or monomers polymerized, the total parts of diluent and the percent thereof that was ether, and the catalyst. --. Column 6, Table I, under Isolated Polymer, RSV $^1 7.2$ should read $^2 7.2$ same Table I, first footnote numbered "2" should read -- 1 --.

Signed and sealed this 29th day of December 1970.

(SEAL)
Attest:

EDWARD M. FLETCHER, JR.
Attesting Officer

WILLIAM E. SCHUYLER, JR.
Commissioner of Patents